Patented Oct. 5, 1948

2,450,866

UNITED STATES PATENT OFFICE 2,450,866

POULTRY TREATMENT COMPOSITION

Neal F. Morehouse and Orley J. Mayfield, Charles City, Iowa, assignors to Dr. Salsbury's Laboratories, Charles City, Iowa, a corporation of Iowa No Drawing. Application October 4, 1946, Serial No. 701,076

16 Claims. (Cl. 167—53.1)

1

This invention relates to the art of veterinary internal medicine, and more particularly the pharmacological treatment of poultry. In its primary adaptations, it is directed both to the physiological development and growth stimulation of poultry, especially chickens and turkeys, and to the control of certain avian diseases, particularly coccidiosis. The present application is a continuation-in-part of the subject matter of a copending application Serial No. 468,274, now abandoned.

Productive poultry management is contingent upon a series of factors which may be summarized under the headings: growth and health. While proper feed, enriched with nutritional accessories and in conjunction with sanitary conditions, is vital for maintaining a healthy and productive flock, it is desirable to enhance this state of normal thriftiness by suitable agents that will stimulate the physiological functions and processes of the birds to an optimum degree. Indicative of such a stimulative effect are gain in weight, early maturity and earlier egg production together with improved tonicity and resistance to disease. It is therefore one object of the present invention to provide a pharmacologically active substance adapted to promote growth and to invigorate the physiological development of poultry.

The second essential factor in successful poultry husbandry is freedom from diseases, among which coccidiosis ranks high for its economic losses among domesticated fowl.

Coccidiosis in poultry is a condition produced by various species of protozoa, namely: *Eimeria mitis, E. praecox, E. acervolina, E. maxima, E. necatrix, E. hagani, E. brunetti,* and *E. tenella* which multiply in the lining of the intestines and cause a severe inflammation of these tissues. Birds infested with these protozoa manifest symptoms, conditioned by the number of protozoa present in the intestinal tract. These symptoms may vary from mild to severe bowel disorders, emaciation, hemorrhage, anemia and death. Illustrative of the manifestations of a prevalent form of the disease which afflicts poultry, especially chickens, is that commonly referred to as cecal or bloody coccidiosis, caused by the coccidium *Eimeria tenella.* This disease is characterized by severe hemorrhage about the fifth day after the infection, which induces a general unthriftiness of the birds. Cecal coccidiosis results in a high mortality in poultry flocks when the infection is severe, and in great economic losses for the poultry industry.

Various therapeutic substances have been tested with a view to raising the tonicity of poultry and increasing their resistance to disease susceptibility and preventing, controlling, or curing coccidiosis. Previous studies conducted in this direction have not been too successful, as the ravages of this disease have continued unabated.

It is therefore another object of this invention to devise an improved expedient for the treatment and control of coccidiosis which will assure a more certain success in checking this infection.

A particular and important object of the present invention is the provision of veterinary medicaments, effective in the development of growth and tonicity and in the control of coccidiosis, which medicaments may be administered to the bird in any orally ingestible vehicle such as solid or liquid feed and drinking water, without adversely affecting their palatability.

Other objects, advantages, of the invention will become apparent from the following description which is intended to be illustrative and not limiting in scope.

We have discovered that certain organic arsenical compounds are pharmacologically active for the physiological development of poultry and for the effective control of coccidiosis. The surprising feature of this discovery resides not only in the manifold actions of our new and useful remedies, but also in the fact that they lend themselves to safe medication despite their generally recognized toxicity to man and animal.

The effective concentrations may vary within certain overlapping ranges according to the purpose in view and are confined within limits which are essentially non-toxic or not excessively toxic to the birds.

We have found that drugs of the character described are represented by nitrated phenyl arsonic compounds, and especially compounds of 3-nitro-4-hydroxy phenyl arsonic acid of the formula

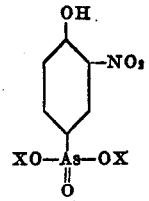

wherein X may be hydrogen or a metal cation.

In other words the compounds within the purview of the present invention comprise 3-nitro-4-hydroxy phenylarsonic acid and its salts, in particular those of the alkali metals, ammonium, alkaline earth metals, such as calcium and barium, and further copper, iron and cobalt. Illustrative of such salt compounds are:

sodium—3-nitro-4-hydroxy phenylarsonate
potassium—3-nitro-4-hydroxy phenylarsonate
ammonium—3-nitro-4-hydroxy phenylarsonate
calcium—3-nitro-4-hydroxy phenylarsonate
copper—3-nitro-4-hydroxy phenylarsonate
iron—3-nitro-4-hydroxy phenylarsonate It will be understood that the foregoing list of salt derivatives is given for the purpose of illustration only, and that there are included within the scope of our invention any such other metallic compounds of 3-nitro-4-hydroxy phenylarsonic acid as may be equivalent to those mentioned and will easily occur to one skilled in the art of veterinary medicine.

This equivalence is predicated upon the possibility that the pharmacological activity of these compounds may, at least partly, be traceable to the anion of the 3-nitro-4-hydroxy phenylarsonic acid. But it is not intended that the scope of the invention be restricted to this particular theory or explanation. In principle, therefore, the scope of this invention embraces all salts of 3-nitro-4-hydroxy phenyl arsonic acid which may be effectively utilized to attain the desired therapeutic effects and the cations of which are not excessively toxic within those useful concentration ranges to be applied.

As previously stated, the therapeutic substances are desirably administered in a vehicle adapted for oral ingestion, and preferably in such substances as are within the category of poultry feed. Whether the vehicle be an aqueous solution, such as drinking water, or any poultry feed, in liquid, solid or mash condition, it is desirable that the drug be homogeneously distributed therein in order to attain the desired uniformity of concentration.

Among the effects of the 3-nitro-4-hydroxy phenylarsonic compounds, the following are noted for their outstanding qualities:

(1) The substances strikingly alleviate and control coccidiosis to a greater degree than any prior art medicament utilized for the same purpose. This increase in efficiency becomes evident by the lower concentrations required to afford comparable results. The significant advantage of this high potency of our new type medicaments lies in the fact that their dosages may be sensibly lowered so that a lesser amount of arsenic need be administered and thereby toxic reactions may be avoided. As a general estimate, adequate quantities of compounds medicated for coccidiosis in accordance with the present invention range about ⅛ of the amount required by organic arsenicals of the prior art used by us.

(2) The new compounds are not only free from any obnoxious taste to the birds when administered in the concentration ranges disclosed herein, but seem to be quite palatable, as evidenced by the readiness with which the poultry imbibe of the drinking solution containing the 3-nitro-4-hydroxy phenyl arsonic compounds or partake of feed containing the same. As a matter of fact, the birds have a tendency to consume more feed or solutions containing the compounds of the invention, as compared with that of the unmedicated feed or water, thereby permitting more uniform dosage of arsenical medicaments.

(3) These therapeutic substances develop in the birds increased tonicity, stimulation of growth, advanced maturity and heightened resistance to infection, not shown by any coccidiostatic substances of the prior art. A multitude of tests were conducted on a large number of poultry, including chickens and turkeys to ascertain the physiological potency of the new compounds with respect to growth, maturity and control of coccidiosis.

As for growth studies, each test involved newly-hatched chicks of a given breed which were divided into two groups, one of which was intended as control and the other for treatment. From the weight records which were carefully maintained throughout the tests, the mean weight gains of the birds in the treated and the control groups were determined and the ratios of the weight increases were calculated. These figures multiplied by 100 represent the percentages of weight gains attained by the treated birds as compared with the untreated ones. Thus, if, for instance, the average gain for a group of treated chickens was found to be 329.9 grams and the gain of the control was 295.7 grams, the percentage of weight gain would be $$\frac{329.9}{295.7} \times 100 = 111.6\%$$

Numerous determinations on this basis have resulted in the findings that the optimum approximate concentration range for growth stimulation applicable to poultry lies between 0.00005% and 0.01%. In particular, turkeys showed the best effect within the range of 0.001% and 0.008%, while chickens responded optimally with approximate dosages between 0.00005% and 0.01%.

It will be understood that the so-defined concentration ranges are only approximative and illustrative of a preferred embodiment of the invention.

They may vary in shifting potencies with the specific salt derivative of the 3-nitro-4-hydroxy phenylarsonic acid used, or the type of vehicle in which the compounds are administered. They may also be subject to variations arising from the particular breed of medicated birds, their state of health and other factors connected with nutritional and climatic conditions. Thus it was found that in some groups of birds even higher ranges produced substantial weight gains, and this in spite of the fact that these birds were severely infected with cecal coccidiosis.

Acceleration of maturity by 3-nitro-4-hydroxy phenylarsonic compounds was proven by a number of tests showing an impressive reduction in age at which egg laying started. The manner of conducting these experiments was identical with that used in the previous investigation. In one significant experiment, for instance, 3-nitro-4-hydroxy phenylarsonic acid was administered in drinking water in a concentration of 0.0026%. The advance in the onset of egg production of the medicated birds over the control group was in excess of three weeks. With salt derivatives of the acid similar results were found, promoting maturity by approximately 13-18 days. At the same time substantial weight gains were registered confirming the previously mentioned values.

For the control of coccidiosis effective dosages start in the upper regions of the growth promotion ranges, depending upon severity of the infection and the general resistance to disease already acquired by the birds.

For practical purposes, dosages ranging from approximately 300 milligrams (0.0079%) to approximately 600 milligrams (0.0158%) per gallon of water are preferably used without any injurious effect on the birds and with excellent results. Concentrations substantially in excess of 0.0158%, may result in some toxic side reactions, although, a dosage of approximately 0.035% of 3-nitro-4-hydroxy phenylarsonic acid equivalent to 1.336 grams per gallon of water was found to be innocuous in repeated cases. As a matter of fact, as much as 1.5 grams per gallon, corresponding to a concentration of 0.04%, have been resorted to without fatal effects.

The potency deviations between the 3-nitro-4-hydroxy phenylarsonic acid and its various salts within the purview of this invention are but slight and never exceed the described above range limits.

The tests resulting in the above mentioned findings relative to the treatment and control of coccidiosis were conducted on a pattern similar to that applied in the studies of growth promotion and maturity. A number of birds, mostly of the New Hampshire variety, were divided into two groups, one of which served as control and the other as test objects. One of several of 3-nitro-4-hydroxy phenylarsonic compounds were thoroughly mixed with drinking water or feed and the test birds were medicated with this composition 3 days in advance of their artificial infection which was carried out with 100,000 sporulated oocysts of *Eimeria tenella*. The time interval embraced by the tests usually comprised approximately 10 days.

The effective concentrations in one set of experiments with the 3-nitro-4-hydroxy phenylarsonic acid were found to be between approximately 0.01% and 0.04%. For the sodium salt, the potent ranges include a lower value 0.008% and a practical upper limit of approximately 0.01%. All controls showed severe hemorrhage and a high incidence of mortality. In contradistinction, control of hemorrhage in the medicated birds was complete.

It should be noted that the various medicaments specified hereinabove are entirely efficient when utilized alone as the therapeutic agent for the physiological development of the poultry and in the control and alleviation of coccidiosis. For field purposes it is frequently desirable to compound the substances in a formulation, such as those illustrated in the following examples:

*Example I*

| | Per cent |
|---|---|
| Sodium phenolsulfonate | 31.50 |
| Ammonium phenolsulfonate | 27.42 |
| Sodium 3-nitro-4-hydroxy phenylarsonate | 3.33 |
| Lactose | 29.42 |
| | 91.67 |
| Dry granules | 91.67 |
| Boric acid | 8.33 |
| | 100.00 |

*Example II*

| | Per cent |
|---|---|
| Sodium phenolsulfonate | 31.50 |
| Ammonium phenolsulfonate | 27.42 |
| Ammonium 3-nitro-4-hydroxy phenylarsonate | 3.33 |
| Lactose | 29.42 |
| | 91.67 |
| Dry granules | 91.67 |
| Boric acid | 8.33 |
| | 100.00 |

*Example III*

| | Per cent |
|---|---|
| Sodium phenolsulfonate | 31.50 |
| Ammonium phenolsulfonate | 27.42 |
| Potassium 3-nitro-4-hydroxy phenylarsonate | 3.33 |
| Lactose | 29.42 |
| | 91.67 |
| Dry granules | 91.67 |
| Boric acid | 8.33 |
| | 100.00 |

When any one of the above compositions is admixed to the drinking water in a proportion of 12 grams per gallon, the concentration of the 3-nitro-4-hydroxy phenylarsonic compound is approximately 0.0105%.

The additional ingredients embodied in the above-described preparations serve to bind the substances when the medicament is made into a tablet and to improve the qualities of the product. As previously stated, the medicament is expediently administered as an aqueous solution of predetermined concentration, but it may similarly be admixed with any vehicle adapted for oral ingestion, and such vehicle may assume the form of a supplementary drug or its equivalent.

The medicament may be dispensed in the form of punched tablets, powder, or solutions.

From the foregoing description it will appear that the therapeutic compounds of this invention are versatile remedies as shown by the manifold physiological actions they manifest when suitably applied. They promote physiological development and growth, stimulate the tonicity of the bird to a healthier performance of its animal functions, advance maturation, assist in the development of resistance to disease, efficiently control coccidiosis, and may have other utilities which are inherent in the substances without visibly and directly manifesting themselves. All these utilities are embraced in the broad spectrum of concentrations extending from approximately 0.00005% to 0.035% in such a manner that the optimum ranges for the various effects merge into each other by gradual transition. It is thus found that growth promotion and weight gain are distinctly noticeable at a concentration of 0.16% which lies well within the range of coccidiostatic dosages. Vice versa the coccidiostatic action of the compounds extends downward into the ranges of stimulative effects at approximately 0.008%, and even lower values may prove efficacious if the medication is continued for a sufficient length of time. The optimum concentration for the acceleration of maturity again has been found to approximate 0.003%, with declining, but still availing potencies above and below this level. The various concentration limits as given, therefore, represent only the most practical and preferred embodiments of the broad concept of the many-sided therapeutic effects of our newly discovered compositions. They are not to be interpreted as limitative, as numerous overlapping ranges of cooperation of useful effects exist between the various fields of specific treatments.

While the invention has been described in accordance with the preferred embodiments, it is apparent that many variations and modifications may be resorted to without departing from the scope of equivalents within the purview and spirit of this invention as defined in the following claims:

We claim:

1. A composition for the treatment of poultry containing a vehicle adapted for oral ingestion and a substance selected from the group consisting of 3-nitro-4-hydroxy phenyl arsonic acid, water soluble salts of 3-nitro-4-hydroxy phenyl arsonic acid and mixtures thereof in the approximate concentration range of 0.00005% to 0.035%.

2. A composition for the treatment of poultry containing a vehicle adapted for oral ingestion and 3-nitro-4-hydroxy phenyl arsonic acid in the approximate concentration range of 0.00005% to 0.035%.

3. A composition for the treatment of poultry comprising an aqueous solution containing a substance selected from the group consisting of 3-nitro-4-hydroxy phenyl arsonic acid, water soluble salts of 3-nitro-4-hydroxy phenyl arsonic acid and mixtures thereof in the approximate concentration range of 0.00005% to 0.035%.

4. A composition for the treatment of poultry comprising an aqueous solution containing 3-nitro-4-hydroxy phenyl arsonic acid in the approximate concentration range of 0.00005% to 0.035%.

5. A composition for the treatment of poultry comprising an aqueous solution containing an alkali metal 3-nitro-4-hydroxy phenyl arsonate in the approximate concentration range of 0.00005% to 0.035%.

6. A composition for the treatment of poultry comprising an aqueous solution containing ammonium 3-nitro-4-hydroxy phenyl arsonate in the approximate concentration range of 0.00005% to 0.035%.

7. A composition for the treatment of poultry comprising an aqueous solution containing sodium 3-nitro-4-hydroxy phenyl arsonate in the approximate concentration range of 0.00005% to 0.035%.

8. A composition for the treatment of poultry comprising a poultry feed containing 3-nitro-4-hydroxy phenyl arsonic acid.

9. A composition for the treatment of poultry comprising a poultry feed containing an alkali metal 3-nitro-4-hydroxy phenyl arsonate.

10. A composition for the treatment of poultry comprising a poultry feed containing ammonium 3-nitro-4-hydroxy phenyl arsonate.

11. A composition for the treatment of poultry comprising a poultry feed containing sodium 3-nitro-4-hydroxy phenyl arsonate.

12. A composition for the control of coccidiosis in poultry containing a vehicle adapted for oral ingestion and a substance selected from the group consisting of 3-nitro-4-hydroxy phenyl arsonic acid, water soluble salts of 3-nitro-4-hydroxy phenyl arsonic acid and mixtures thereof in the approximate concentration range of 0.0079% to 0.035%.

13. A composition for the control of coccidiosis in poultry comprising a vehicle adapted for oral ingestion containing an alkali metal salt of 3-nitro-4-hydroxy phenyl arsonic acid in the approximate concentration range of 0.0079% to 0.0158%.

14. A composition for the control of coccidiosis in poultry comprising a vehicle adapted for oral ingestion containing 3-nitro-4-hydroxy phenyl arsonic acid in the approximate concentration range of 0.0079% to 0.0158%.

15. A composition for the control of coccidiosis in poultry comprising a vehicle adapted for oral ingestion containing a substance selected from the group consisting of 3-nitro-4-hydroxy phenyl arsonic acid, water soluble salts of 3-nitro-4-hydroxy phenyl arsonic acid and mixtures thereof, and containing an alkali metal-phenol sulfonate, lactose, and boric acid, the concentration of the arsonate compound being in the approximate range of 0.0079% to 0.0158%.

16. A composition for the control of coccidiosis in poultry comprising an aqueous solution containing 3-nitro-4-hydroxy phenyl arsonic acid in the approximate concentration range of 0.0079% to 0.035%.

NEAL F. MOREHOUSE.
ORLEY J. MAYFIELD.

REFERENCES CITED

The following references are of record in the file of this patent:

UNITED STATES PATENTS

| Number | Name | Date |
|---|---|---|
| 1,607,299 | Ostromislensky | Nov. 16, 1926 |

OTHER REFERENCES

Harwood et al., Journal of the American Veterinary Medical Association, vol. 97, Sept. 1940, page 250.

Certificate of Correction

Patent No. 2,450,866 — October 5, 1948

NEAL F. MOREHOUSE ET AL.

It is hereby certified that error appears in the printed specification of the above numbered patent requiring correction as follows:

Column 6, line 52, for "0.16%" read *0.016%*;

and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*